US008960395B2

(12) United States Patent
Waters et al.

(10) Patent No.: US 8,960,395 B2
(45) Date of Patent: Feb. 24, 2015

(54) TORQUE CONVERTER ASSEMBLY WITH FLUID MANIFOLD

(71) Applicant: Caterpillar Inc., Peoria, IL (US)

(72) Inventors: Timothy Michael Waters, Peoria, IL (US); Timothy James May, Princeton, IL (US); Jason Ray Walker, Pekin, IL (US); Edward De Jesus Rivera, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 168 days.

(21) Appl. No.: 13/631,099

(22) Filed: Sep. 28, 2012

(65) Prior Publication Data

US 2013/0081916 A1  Apr. 4, 2013

Related U.S. Application Data

(60) Provisional application No. 61/541,802, filed on Sep. 30, 2011.

(51) Int. Cl.
*F16D 67/04* (2006.01)
*F16H 45/02* (2006.01)
*F16H 61/00* (2006.01)
*F16H 41/30* (2006.01)

(52) U.S. Cl.
CPC .......... *F16H 45/02* (2013.01); *F16H 2045/021* (2013.01); *F16H 2045/0215* (2013.01); *F16H 2061/0046* (2013.01); *F16H 41/30* (2013.01)
USPC .......... 192/3.23; 192/3.34; 192/12 C

(58) Field of Classification Search
CPC .......... F16H 41/02; F16D 2048/0224
USPC .......... 192/3.23, 3.34
See application file for complete search history.

(56) References Cited

U.S. PATENT DOCUMENTS

| 2,224,884 A | 12/1940 | Schneider et al. |
| 2,226,801 A | 12/1940 | Black |
| 2,258,684 A | 10/1941 | Lysholm et al. |
| 2,858,675 A | 11/1958 | Schneider |
| 2,949,047 A | 8/1960 | Burckhardt |
| 3,110,196 A * | 11/1963 | Hilpert et al. .......... 477/55 |
| 3,259,218 A * | 7/1966 | Black et al. .......... 192/3.29 |
| 4,066,157 A | 1/1978 | Gibbs |
| 4,077,502 A | 3/1978 | Nitsche et al. |

(Continued)

FOREIGN PATENT DOCUMENTS

| JP | 01120477 | 5/1984 |
| JP | 62165064 | 7/1987 |

*Primary Examiner* — Gene Crawford
*Assistant Examiner* — Mark Manley
(74) *Attorney, Agent, or Firm* — Finnegan, Henderson, L.L.P.

(57) ABSTRACT

A manifold for a torque converter assembly is disclosed. The manifold may have a base portion configured to be fixedly connected to a frame of a mobile machine. The base portion may have a first face, a second face, and an outer radial surface located between the first face and the second face. The manifold may also have a sleeve portion extending axially away from the second face of the base portion. The sleeve portion may have an outer radial surface. The base portion may further have a first passageway configured to receive hydraulic fluid. The first passageway may have an inlet in the outer radial surface of the base portion and an outlet in the outer radial surface of the sleeve portion. The manifold may also have a second passageway configured to receive hydraulic fluid. The second passageway may have an inlet in the first face and an outlet in the second face.

18 Claims, 11 Drawing Sheets

(56) References Cited

U.S. PATENT DOCUMENTS

| | | | |
|---|---|---|---|
| 4,191,072 A * | 3/1980 | Ehrlinger et al. | ............... 475/68 |
| 4,246,997 A | 1/1981 | Tarumizu | |
| 4,819,509 A | 4/1989 | Rohne et al. | |
| 5,947,242 A | 9/1999 | Creger | |
| 2011/0114433 A1 | 5/2011 | Hattori et al. | |

* cited by examiner

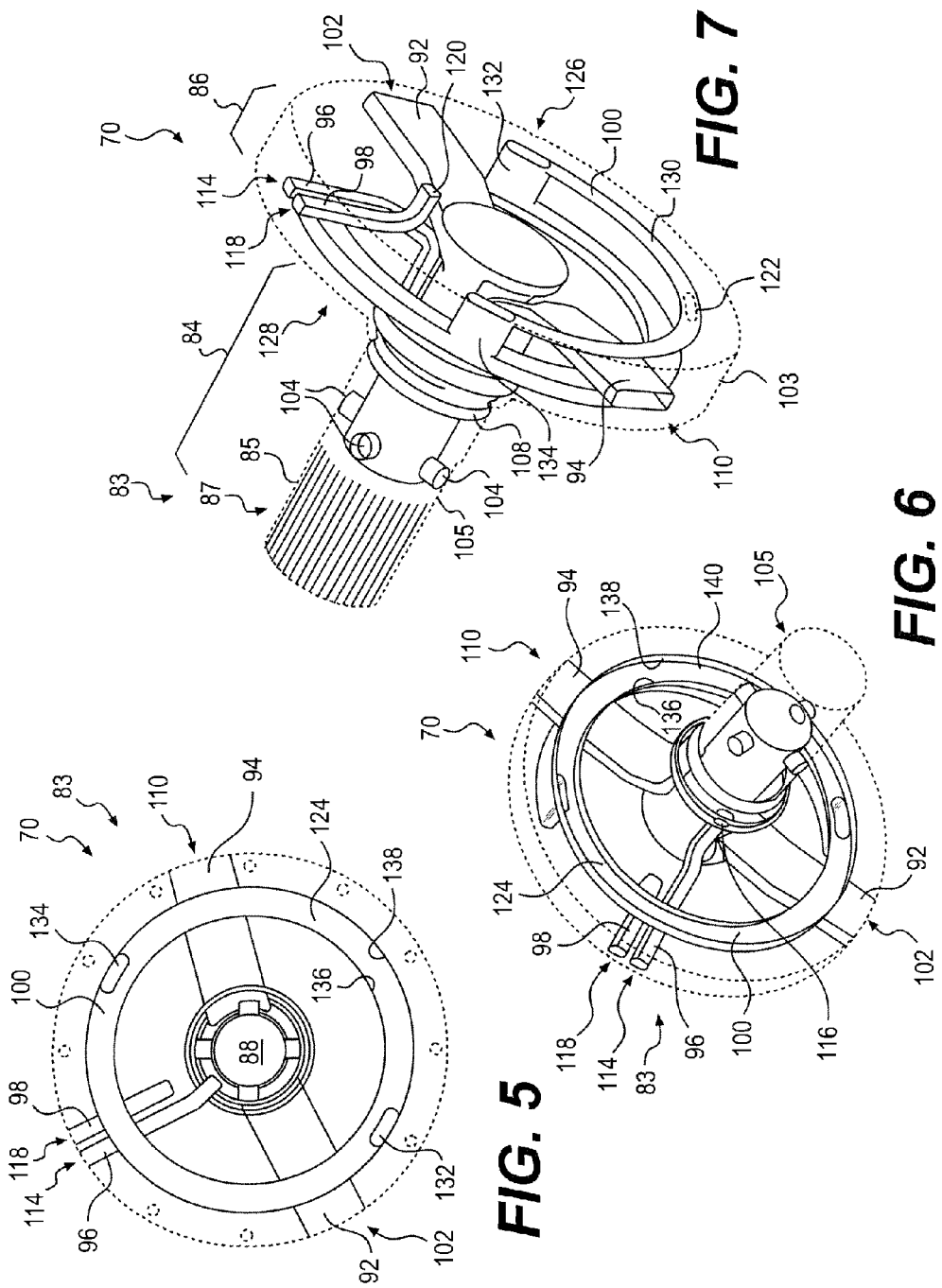

TORQUE CONVERTER ASSEMBLY WITH FLUID MANIFOLD

CROSS-REFERENCE TO RELATED APPLICATIONS

This application is based upon and claims the benefit of priority under 35 U.S.C. §119(e) of U.S. Provisional Application No. 61/541,802 to Waters et al. filed on Sep. 30, 2011.

TECHNICAL FIELD

The present disclosure relates generally to a torque converter assembly and, more particularly, to a torque converter assembly having a fluid manifold.

BACKGROUND

Mobile machines, including on- and off-highway haul and vocational trucks, wheel loaders, motor graders, and other types of heavy machinery often include a mechanical transmission coupled to an engine through a torque converter assembly. A torque converter utilizes a fluid coupling that allows slippage between an engine and a transmission. Torque converters may also utilize one or more clutches, such as an impeller clutch and a lockup clutch, to improve efficiency and increase flexibility of operation of the mobile machine.

One device providing a torque converter with multiple clutches is disclosed in U.S. Pat. No. 5,947,242 to Creger. Creger discloses an electrohydraulic control device for a drive train. Specifically, Creger discloses an engine, a torque converter having an impeller element, a reactor element and a turbine element, and an impeller clutch drivingly connected between the engine and the impeller element. Creger also discloses a set of service brakes. Creger discloses that an impeller brake is drivingly connected between the impeller element and a stationary support member. A controller receives at least one input signal representing an operation of the drive train and responsively controls one of the impeller clutch, impeller brake, and brake set.

Although Creger discloses an impeller clutch and an impeller brake for a hydraulic torque converter, further improvement is possible. For example, Creger does not disclose the manner in which the hydraulic components are physically or fluidly connected to the hydraulic torque converter or to the mobile machine.

SUMMARY

In one aspect, the present disclosure is directed to a manifold for a torque converter assembly. The manifold may include a base portion configured to be fixedly connected to a frame of a mobile machine. The base portion may have a first face, a second face, and an outer radial surface located between the first face and the second face. The manifold may also include a sleeve portion extending axially away from the second face of the base portion. The sleeve portion may have an outer radial surface. The base portion may further include a first passageway configured to receive hydraulic fluid. The first passageway may have an inlet in the outer radial surface of the base portion and an outlet in the outer radial surface of the sleeve portion. The manifold may also include a second passageway configured to receive hydraulic fluid. The second passageway may have an inlet in the first face and an outlet in the second face.

The present disclosure is also directed to a torque converter assembly for a machine. The torque converter may include an output shaft defining a central axis having a first end and a second end and an impeller disposed about the output shaft. The torque converter may also include a turbine disposed about the output shaft that is configured to rotate in response to rotation of the impeller. The torque converter may further include a hydraulic impeller clutch configured to couple the impeller to a rotational input to cause the impeller to rotate. The torque converter may also include a manifold configured to be connected to a frame of the machine such that the manifold does not rotate with respect to the frame. The torque converter may further include a hydraulic retarder clutch connected to the manifold and configured to couple the impeller to the manifold to reduce rotation of the impeller. The manifold may include a first fluid passageway configured to supply hydraulic fluid to the impeller clutch and a second fluid passageway configured to supply hydraulic fluid to the hydraulic retarder clutch.

The present disclosure is further directed to a method of supplying fluid to a torque converter of a mobile machine with a manifold. The method may include flowing a first fluid through a first passageway of the manifold and flowing the first fluid out of the first passageway and into an impeller clutch to actuate the impeller clutch. The method may also include flowing a second fluid through a second passageway of the manifold and flowing the second fluid out of the second passageway and into a retarder clutch to actuate the retarder clutch. The method may further include flowing a third fluid through a third passageway of the manifold and flowing the third fluid out of the third passageway and into fluid contact with an impeller and a turbine of the torque converter. The manifold may be fixedly connected to a frame of the mobile machine

BRIEF DESCRIPTION OF THE DRAWINGS

FIG. 5 is a view of a manifold from the torque converter assembly of FIG. 2;

FIG. 6 is a perspective view of the manifold of FIG. 5;

FIG. 7 is another view of the manifold of FIG. 5;

DETAILED DESCRIPTION

Figure 1:
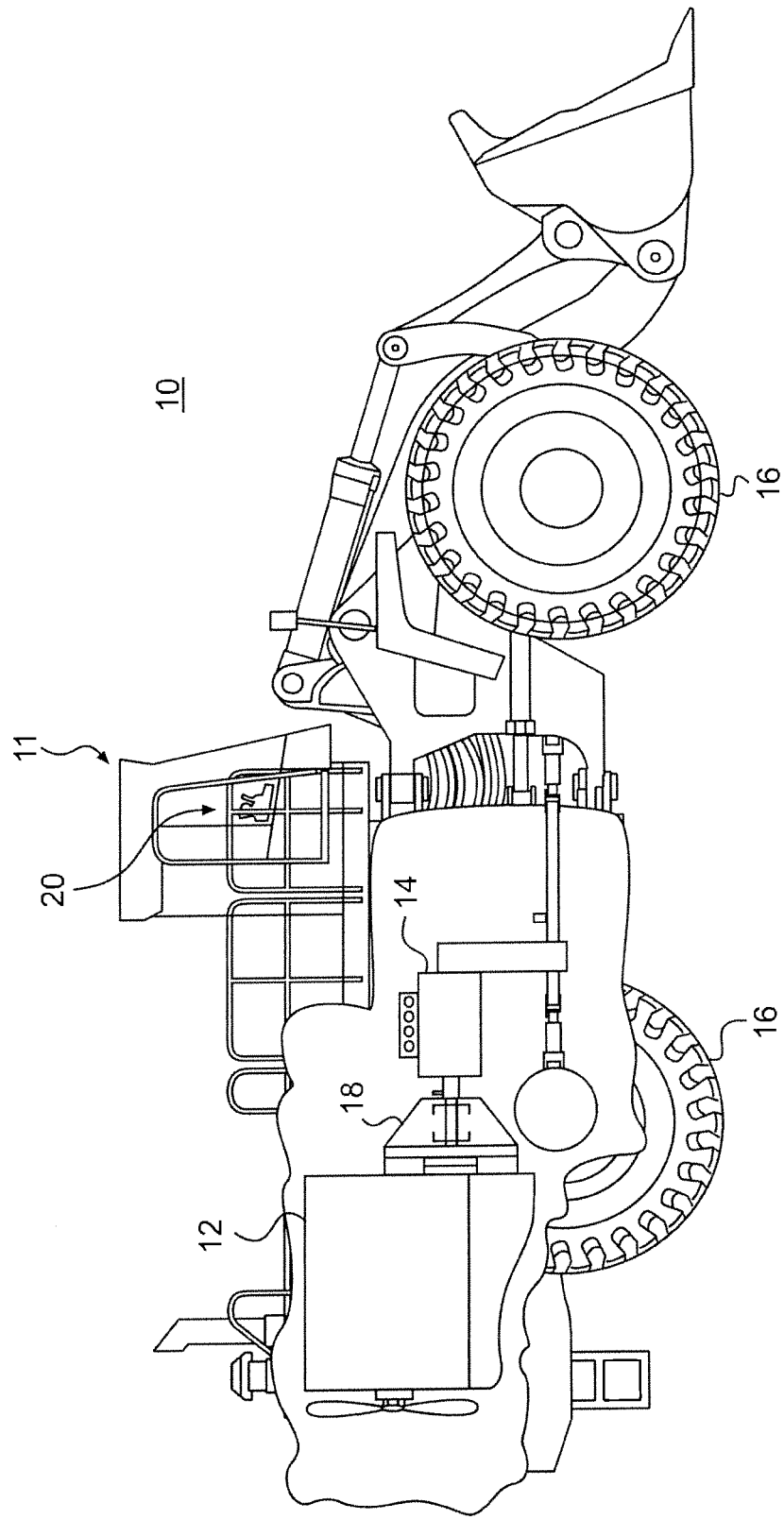
FIG. 1 is an illustration of an exemplary disclosed machine.

FIG. 1 illustrates an exemplary machine 10. Machine 10 may be a mobile machine that performs some type of operation associated with an industry, such as mining, construction, farming, transportation, or any other industry known in the art. Machine 10 may be an earth moving machine, such as a wheel loader, an off-highway haul truck, a motor grader, or any other suitable earth moving machine. Machine 10 may also be an on-highway vocational truck, a passenger vehicle, or any other operation-performing machine. Machine 10 may include, among other things, an operator station 11, a power source 12, a transmission 14, traction devices 16, and a torque converter assembly 18.

Operator station 11 may be a location from which an operator manages operation of machine 10. Operator station 11 may include one or more operator input devices 20 configured to control operation/performance of machine 10. Operator input devices 20 may be located proximal an operator seat and embody, for example, single or multi-axis joysticks, wheels, knobs, push-pull devices, pedals, switches, buttons, touch screen icons, and other operator input devices known in the art.

Power source 12 may be a device configured to produce a power output. Power source 12, may be an internal combustion engine, such as a diesel engine, a gasoline engine, a gaseous fuel-powered engine, or any other combustion engine. Power source 12 may alternatively embody an electric motor coupled to a generator or some other source of electrical power. Power source 12 may further embody a hydraulic motor driven by a combustion engine.

Transmission 14 may include numerous components that interact to transmit power from power source 12 to traction devices 16. In particular, transmission 14 may embody a multi-speed, mechanical transmission having a neutral gear ratio, a plurality of forward gear ratios, one or more reverse gear ratios, and one or more clutches (not shown). The clutches may be selectively actuated to engage predetermined combinations of gears (not shown) that produce a desired output gear ratio. Transmission 14 may be an automatic-type transmission or a manual transmission. Transmission 14 may further be a continuously variable transmission.

Traction devices 16 may be devices configured to engage the ground and propel machine 10. Traction devices 16 embody wheels located on each side of machine 10 (only one side shown). Alternately, traction devices 16 may embody tracks, belts, or other driven traction devices. Traction devices 16 may be driven by transmission 14 to rotate in accordance with an output rotation of transmission 14.

Figure 2:
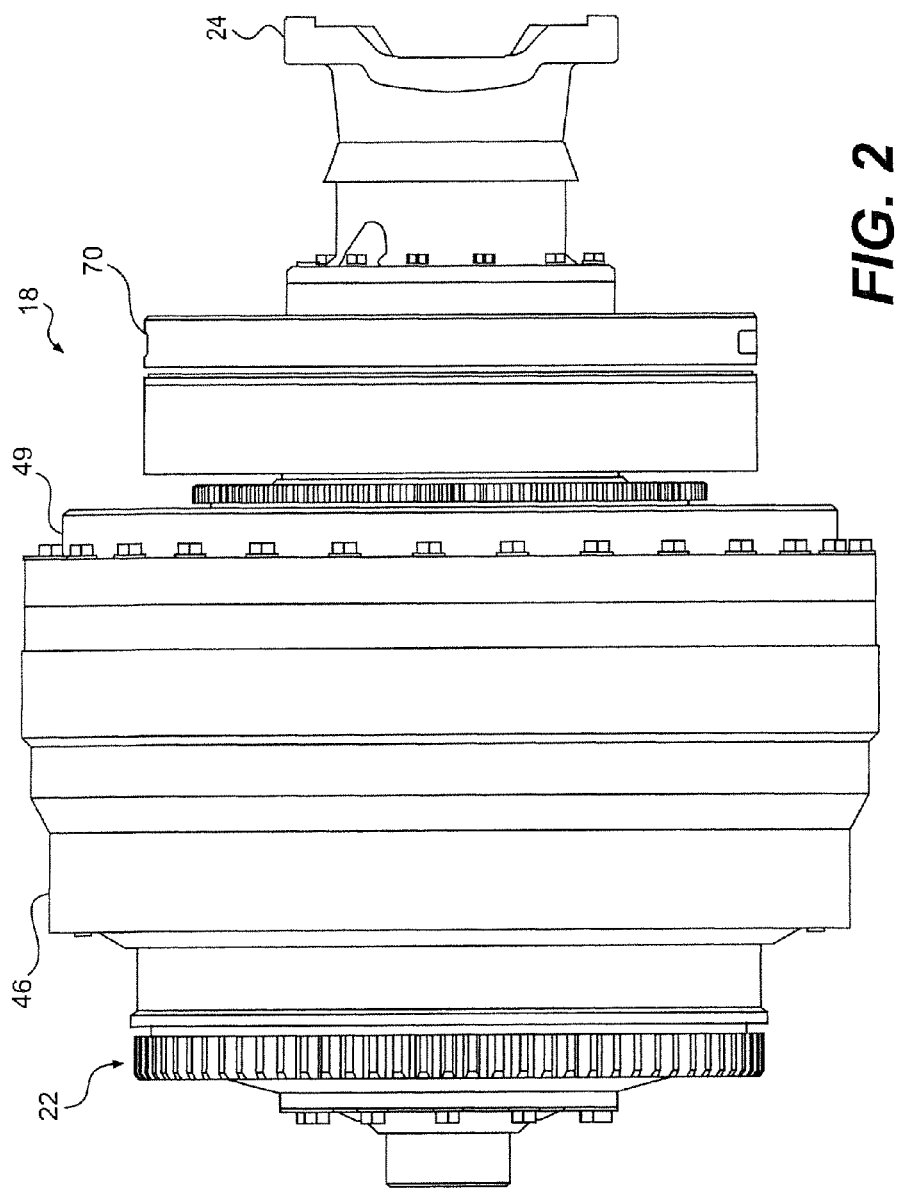
FIG. 2 is an illustration of a disclosed torque converter assembly.

FIG. 2 illustrates torque converter assembly 18 in more detail. Torque converter assembly may receive a rotational input via rotational element 22 and provide a rotational output via shaft 24. Torque converter assembly 18 may be used to transmit power between power source 12 and transmission 14, while in some circumstances allowing rotational element 22 (i.e., power source side) to rotate at a different speed relative to shaft 24 (i.e., transmission side).

Figure 3:
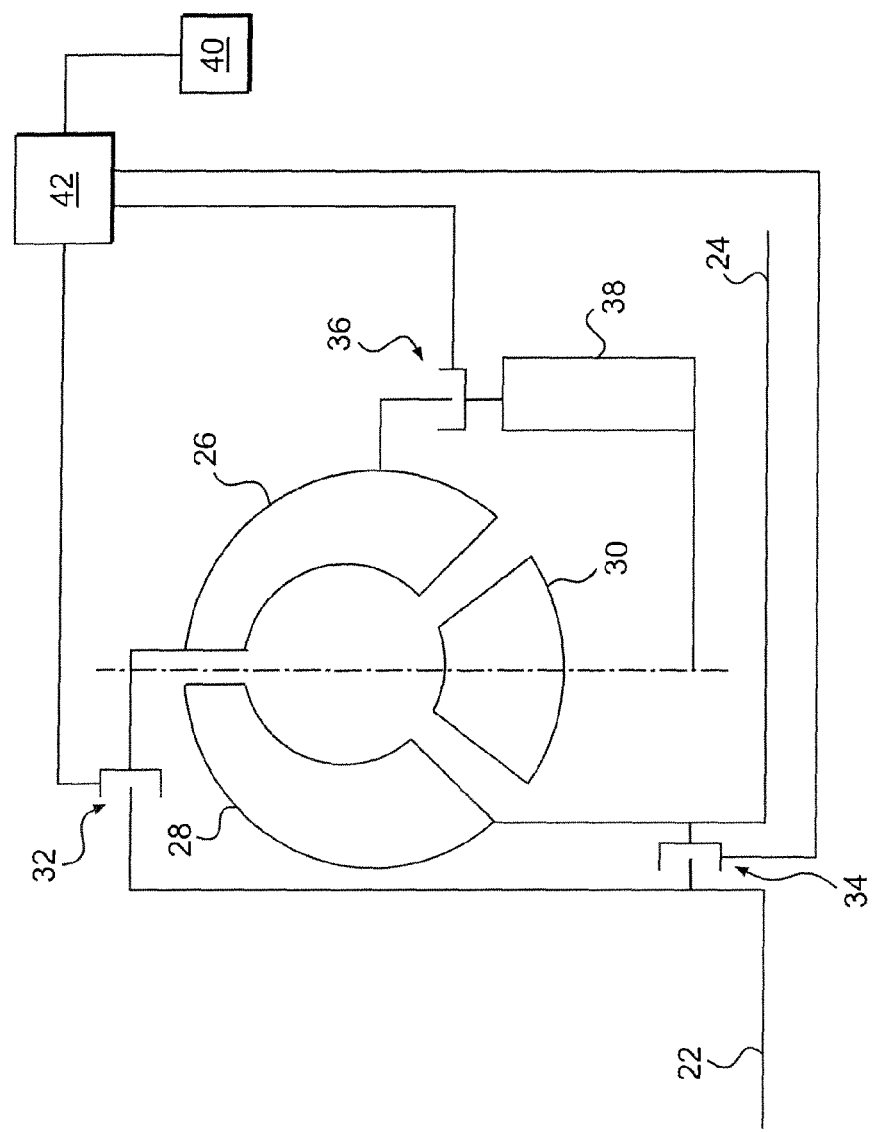
FIG. 3 is a diagrammatic illustration of the disclosed torque converter assembly.

Referring generally to FIG. 3, torque converter assembly 18 may include an impeller 26, a turbine 28, and a stator 30 (with or without a one way clutch). Impeller 26 may rotate as a result of power source 12 providing a rotational input. Rotation of impeller 26 may impart a momentum to a fluid that is transferred to turbine 28. Turbine 28 may receive this momentum, thus causing turbine 28 and subsequently transmission 14 to rotate. At low fluid flow rates and pressures, impeller 26 may rotate at a higher speed relative to turbine 28. As the pressure and the flow rate of the fluid conducted between impeller 26 and turbine 28 increase, turbine 28 may approach the rotational speed of impeller 26.

Torque converter assembly 18 may include a plurality of clutches, including an impeller clutch 32, a lockup clutch 34, and a retarder clutch 36. Each of clutches 32, 34, and 36 may embody a disc-type clutch. Selective engagement of clutches 32, 34, and 36 or combinations of clutches 32, 34, and 36 may cause rotational power to flow through different components of torque converter assembly 18. For example, impeller clutch 32 may allow variable mechanical coupling between rotational element 22 and impeller 26. Lockup clutch 34 may allow for variable mechanical coupling between rotational element 22 and output shaft 24. Retarder clutch 36 may allow variable mechanical coupling between impeller 26 and a stationary component 38 of machine 10. Stationary component 38 may be a mechanical ground, such as a frame of machine 10 or a component fixedly connected to the frame of machine 10. Fully engaging retarder clutch 36 may inhibit rotation of impeller 26, thus providing hydraulic flow resistance for retarding movement of machine 10.

A control system 40 may communicate with a hydraulic circuit 42 to hydraulically engage different combinations of clutches 32, 34, 36 in order to place machine 10 into different modes of operation. For example, control system 40 may implement a machine launch mode when machine 10 first commences movement from a stopped state or at low ground speeds generally. Control system 40 may also implement a direct drive mode when machine 10 has reached higher ground speeds. Direct drive mode may engage a direct mechanical link between power source 12 and transmission 14 for improved efficiency. Control system 40 may further implement a retarder mode. Control system 40 may implement retarder mode to generate resistance to the movement of machine 10 (e.g., for braking, maintaining a constant speed on a down slope, etc.) It is contemplated that the control system 40 may implement different modes of operation automatically, based on input received via operator input devices 20, or a combination of both. Table 1 below illustrates the different modes of clutches 32, 34, 36 implemented by control system 40.

TABLE 1

| Operating Mode | Impeller Clutch | Lock-up Clutch | Retarder Clutch |
|---|---|---|---|
| Machine Launch Mode | On | Off | Off |
| Direct Drive Mode | Off | On | Off |
| Retarder Mode | Off | On | On |

Figure 4:
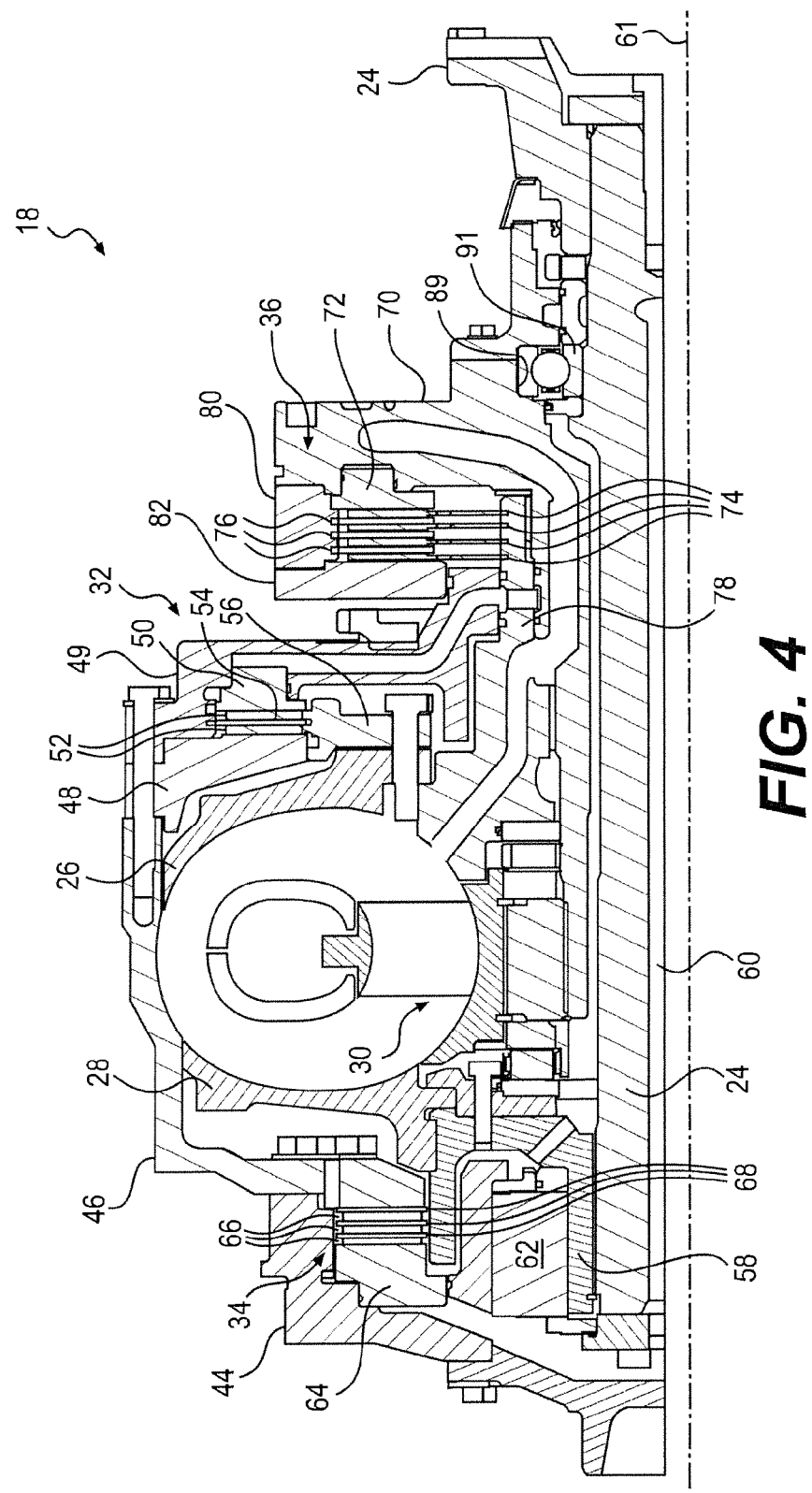
FIG. 4 is a cross-sectional view of the torque converter assembly of FIG. 2.

FIG. 4 shows a cutaway view of one embodiment of a torque converter assembly 18. Torque converter assembly 18 may receive a rotational input through spline element 44 (driven by power source 12 through rotational element 22). Spline element 44 may be mechanically connected to a housing 46. Housing 46 may be an outer radial surface of torque converter assembly 18. Housing 46 may be mechanically connected (e.g., bolted) to an impeller clutch backing plate 48 and also connected via the same connection to a housing back plate 49. Housing back plate 49 and impeller clutch backing plate 48 may be configured to house components of impeller clutch 32. Specifically, housing back plate 49 may define a space configured to receive an impeller clutch piston 50. Piston 50 may be hydraulically actuated. Upon receipt of pressurized hydraulic fluid, piston 50 may press friction disks 52 into frictional engagement with a separating plate 54 (or a plurality of separating plates 54), thus causing impeller clutch 32 to engage. Friction disks 52 may oppose each other and frictionally engage on opposite sides of separating plate 54. Separating plate 54 may be mechanically fastened to housing back plate 49. Friction disks 52 may be mechanically fastened to an impeller spline hub 56, and impeller spline hub 56 may be mechanically fastened to impeller 26.

It is contemplated that a rotational input through spline element 44 may cause housing 46, impeller clutch backing plate 48, housing back plate 49, and separating plate 54 to rotate. When impeller clutch 32 is engaged, impeller spline hub 56 and impeller 26 may also rotate. Each of housing 46, impeller clutch backing plate 48, housing back plate 49, impeller clutch 32, impeller spline hub 56, and impeller 26 may be annular in shape and may be composed of steel, iron, aluminum, or any other suitable material.

Rotation of impeller 26 may result in rotation of turbine 28. Turbine 28 may be connected via a mechanical connection (e.g., a spline) to a turbine hub 58. Turbine hub 58 may be connected via a mechanical connection (e.g., a spline) to shaft 24. Shaft 24 may be mechanically connected to transmission 14. It is contemplated that impeller clutch 32 may partially engage to allow slip between separating plate 54 and friction disks 52. Alternatively, impeller clutch 32 may fully engage such that there is no slip between separating plate 54 and friction disks 52. Control system 40 may control the degree of engagement of impeller clutch 32.

Shaft 24 may be substantially cylindrical in shape with a passageway 60 passing along its longitudinal axis 61. Passageway 60 may also be substantially cylindrical in shape. A bearing 62 may be located between turbine hub 58 and spline element 44 to allow for relative rotation between the parts. Turbine 28 and turbine hub 58 may be annular in shape. It is contemplated that turbine 28, turbine hub 58, and shaft 24 may be composed of steel, iron, aluminum, or any other suitable material.

Lockup clutch 34 may allow direct engagement between spline element 44 and turbine hub 58. Lockup clutch 34 may include a hydraulically actuated piston 64. Upon receipt of pressurized hydraulic fluid, a face of piston 64 may press friction disks 66 into frictional engagement with one or more separating plates 68, thus causing lockup clutch 34 to engage. Friction disks 66 may be mechanically fastened to turbine hub 58, and separating plates 68 may be mechanically attached to spline element 44.

It is contemplated that lockup clutch 34 may partially engage to allow slip between separating plates 68 and friction disks 66. Alternatively, lockup clutch 34 may fully engage such that there is no slip between separating plates 68 and friction disks 66. Control system 40 may control the degree of engagement of lockup clutch 34. Components of lockup clutch 34 may be annular in shape.

Retarder clutch 36 may allow engagement between a stationary component, such as a manifold 70 (described in further detail below), and impeller 26. Retarder clutch 36 may include a hydraulically actuated piston 72. Upon receipt of pressurized hydraulic fluid, a face of piston 72 may press friction disks 74 into frictional engagement with separating plates 76 and a retarder backing plate 82, thus causing retarder clutch 36 to engage. Friction disks 74 may be attached to impeller hub 78, which is mechanically fastened to impeller 26. Separating plates 76 may be attached to a spline plate 80, which is mechanically fastened to manifold 70. Portions of friction disks 74 and separating plates 76 may be axially located between piston 72 and a retarder backing plate 82. In some embodiments, retarder clutch 36 may include three separating plates 76 and four friction disks 74, although using fewer or more separating plates 76 and friction disks 74 is also contemplated.

Retarder clutch 36 may partially engage to allow slip between separating plates 76 and friction disks 74. Alternatively, retarder clutch 36 may fully engage such that there is no slip between separating plates 76 and friction disks 74. Control system 40 may control the degree of engagement of retarder clutch 36. Components of retarder clutch 36 and impeller hub 78 may be annular in shape.

Hydraulic circuit 42 (see, e.g., FIG. 3) may provide pressurized hydraulic fluid to impeller 26, turbine 28, impeller clutch 32, lockup clutch 34, and retarder clutch 36. Hydraulic circuit 42 may include a hydraulic fluid tank, a pressure source (or a plurality of pressure sources), and a plurality of valves. It is contemplated that the pressure source may pressurize hydraulic fluid. Hydraulic circuit 42 may direct the pressurized fluid to one or more of impeller 26, turbine 28, impeller clutch 32, lockup clutch 34, and retarder clutch 36 based on which of the plurality of valves is actuated. In some embodiments, hydraulic circuit 42 may actuate the plurality of valves to independently supply a flow of pressurized hydraulic fluid to each of impeller 26, turbine 28, impeller clutch 32, lockup clutch 34, and retarder clutch 36. It is contemplated that control system 40 may control the actuation of the pressure source and the actuation of the valves.

FIGS. 5-7 illustrate manifold 70. Manifold 70 may be a stationary component fixedly connected to a frame of machine 10. Manifold 70 may be composed of a body 83 having an elongate sleeve portion 84 and a base portion 86. Base portion 86 may be a substantially disk-shaped element having a first face 126 and a second face 128. Referring back to FIG. 4, base portion 86 may include an inset 89. A radial bearing 91 may be set in inset 89 to allow rotation of shaft 24 with respect to manifold 70.

Returning to FIGS. 5-7, sleeve portion 84 may extend axially away from second face 128 of base portion 86. Sleeve portion 84 may be substantially cylindrically shaped. Sleeve portion 84 may also include a plurality of annular ridges (splines) 85 on an end 87 of sleeve portion 84. Ridges 85 may be configured to interact with stator 30. Sleeve portion 84 and base portion 86 may define a cylindrically shaped space 88 configured to receive shaft 24.

It is contemplated that sleeve portion 84 and base portion 86 may be composed of a single piece of material (i.e., sleeve portion 84 and base portion 86 may be integral). Alternatively, sleeve portion 84 and base portion 86 may be composed of two separate pieces of material that are joined by mechanical fastening, bonding, welding, or in any other appropriate manner. Sleeve portion 84 and base portion 86 may be composed of steel, aluminum, iron, or any other appropriate material.

Manifold 70 may be configured to receive and route hydraulic fluid to multiple components of torque converter assembly 18. Specifically, manifold 70 may route hydraulic fluid to impeller/turbine 26, 28, impeller clutch 32, lockup clutch 34, and retarder clutch 36 through a plurality of passageways. Manifold 70 may include a torque converter inlet passageway 92, a torque converter outlet passageway 94, an impeller clutch passageway 96, a lockup clutch passageway 98, and a retarder clutch passageway 100.

Torque converter inlet passageway 92 may provide hydraulic fluid to impeller 26 and turbine 28. Torque converter inlet passageway 92 may have an inlet 102 located in an outer radial surface 103 of base portion 86 and a plurality of outlets 104 located in an outer radial surface 105 of sleeve portion 84. Inlet 102 may receive hydraulic fluid from hydraulic circuit 42. Inlet 102 may receive hydraulic fluid in a radial direction from a longitudinal axis of manifold 70, and outlets 104 may provide the hydraulic fluid in a radially outward direction with respect to the longitudinal axis. At least within base portion 86, torque converter inlet passageway 92 may have a substantially rectangular cross section. Torque converter inlet passageway 92 may also define a "J" shaped pathway.

Torque converter outlet passageway 94 may receive hydraulic fluid from impeller 26 and turbine 28 for transmission back to hydraulic circuit 42. Torque converter outlet passageway 94 may have an inlet 108 and at least one outlet 110. Inlet 108 may be located in outer radial surface 105. Outlet 110 may be located in outer radial surface 103. Within base portion 86, torque converter outlet passageway 94 may have a substantially rectangular cross section. Torque converter outlet passageway 94 may also define a "J" shaped pathway.

Impeller clutch passageway 96 may receive hydraulic fluid from hydraulic circuit 42 for transmission to impeller clutch 32. Impeller clutch passageway 96 may have an inlet 114 and an outlet 116. Inlet 114 may be located in outer radial surface 103, and outlet 116 may be located in outer radial surface 105. At least within base portion 86, impeller clutch passageway 96 may have a substantially cylindrical or square cross section. Impeller clutch passageway 96 may define a "J" shaped pathway.

Lockup clutch passageway 98 may receive hydraulic fluid from hydraulic circuit 42 for transmission to lockup clutch 34. Lockup clutch passageway 98 may have an inlet 118 and an outlet 120. Inlet 118 may be located in outer radial surface 103, and outlet 120 may be located in first face 126. At least within base portion 86, lockup clutch passageway 98 may have a substantially cylindrical or square cross section. Lockup clutch passageway 98 may define a "J" shaped pathway. The "J" shape of lockup clutch passageway 98 may be oriented in a generally opposite direction of the "J" shape of impeller clutch passageway 96.

Retarder clutch passageway 100 may receive hydraulic fluid from hydraulic circuit 42 for transmission to retarder clutch 36. Retarder clutch passageway 100 may have an inlet 122, a semicircular passageway 130, first and second axial passageways 132, 134, and an outlet 124.

Inlet 122 may be located in first face 126 of base portion 86. Inlet 122 may consist of a aperture in first face 126 leading to semicircular passageway 130. Inlet 122 may be located approximately at a midpoint of semicircular passageway 130, such that fluid flows approximately equally in opposed circumferential directions about semicircular passageway 130. A first flow of fluid may flow around semicircular passageway 130 and may enter first axial passageway 132. First axial passageway 132 may have a substantially rectangular cross section with rounded corners. A longitudinal dimension of first axial passageway 132 (i.e., flow direction) may be substantially aligned with the longitudinal axis of manifold 70. A second flow of fluid may flow around semicircular passageway and may enter second axial passageway 134. Similar to first passageway 132, second axial passageway 134 may have a substantially rectangular cross section with rounded corners. A longitudinal dimension of second axial passageway 134 (i.e., flow direction) may also be substantially aligned with the longitudinal axis of manifold 70. First and second axial passageways 132, 134 may be approximately 180 degrees apart. Utilizing first and second axial passageways 132, 134 may ensure that fluid travels evenly into outlet 124 for a more balanced application of pressure.

After the first and second flows pass through respective first and second passageways 132, 134, the first and second flows may enter outlet 124. Outlet 124 may be located on second face 128 of base portion 86. Outlet 124 may have a substantially annular shape that allows fluid to pass circumferentially about second face 128. Outlet 124 may have a first radial wall 136, a second radial wall 138, and an inset surface 140. First radial wall 136, second radial wall 138, and inset surface 140 may form a channel in second face 128. First and second radial wall 136, 138 may be substantially parallel and may have a height and relative spacing such that a rear portion of retarder piston 72 can be seated therebetween (see, e.g., FIG. 13). It is contemplated that the height of first and second radial walls 136, 138 may allow some space between a rearmost surface of piston 72 and inset surface 140. The circumferential nature of outlet 124 allows the hydraulic fluid to act evenly around the rear portion of piston 72.

Figure 8:
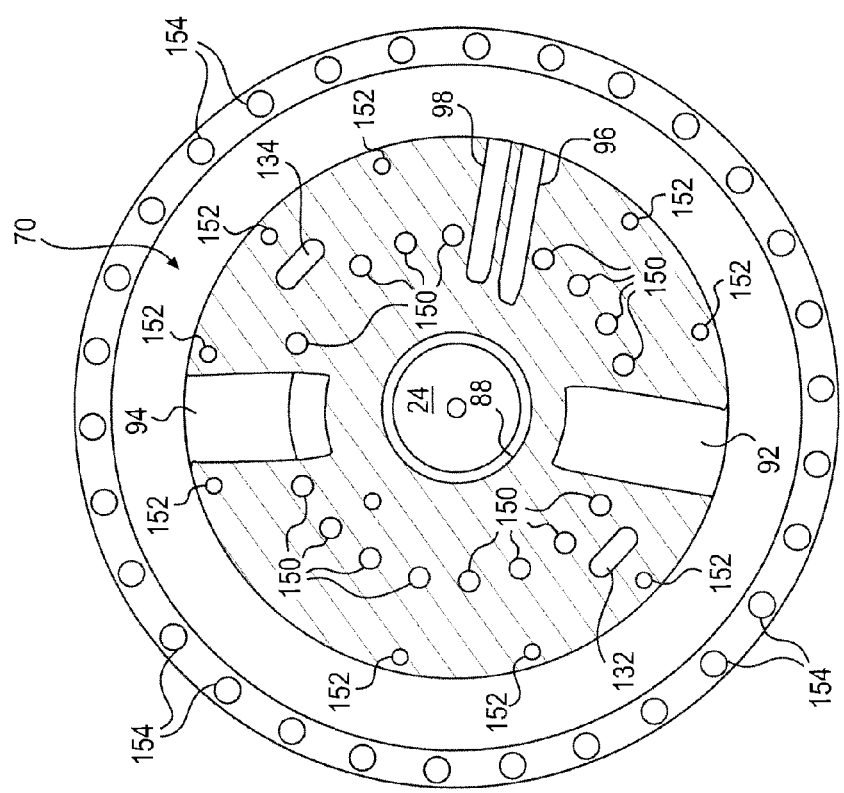
FIG. 8 is a cross-sectional view of the manifold of FIG. 5.

FIG. 8 shows a cross-sectional view of manifold 70. Manifold 70 may act as a mechanical ground to prevent rotation of certain components of torque converter 18. Manifold 70 may therefore include a plurality of connection points 152 to fixedly connect to the frame of machine 10. Connection points 152 may receive mechanical fasteners, such as bolts, screws, rivets, or other types of mechanical connectors, to attach to the frame of machine 10. Alternatively or additionally, manifold 70 may be welded or integrally formed with the frame of machine 10. Manifold 70 may also include a plurality of connection points 154 where spline plate 80 (see FIG. 4) may connect to manifold 70. Connection points 154 may thus ground retarder clutch 36 such that retarder clutch 36 does not rotate with respect to the frame of machine 10. Retarder clutch 36 may connect to manifold 70 at connection points 154 via mechanical fasteners, welding, and/or in any other appropriate manner. It is contemplated that manifold 70 may also indirectly be fixedly connected to the frame of machine 10. Connection points 150 may connect an outlet component 156 (see FIG. 12) to manifold 70.

It is contemplated that each fluid passageway (e.g., passageways 92, 94, 96, 98, 100) in manifold 70 may be sized to allow sufficient fluid flow to supply the component(s) associated with each fluid passageway. Since manifold 70 also provides a mechanical ground for retarder clutch 36, the fluid passageways and a thickness of walls within manifold 70 may be sized such that the walls of manifold 70 have sufficient structural rigidity and strength to withstand the torsional loading transmitted through retarder clutch 36.

In embodiments where manifold 70 is a unitary structure, heat transfer may more efficiently occur between the fluids traveling through passageways 92, 94, 96, 98, 100. It is contemplated that a diameter and orientation of the fluid passageways within manifold 70, as well as a material used for manifold 70, may be configured to further improve the heat transfer between passageways 92, 94, 96, 98, 100 of manifold 70.

Figure 9:
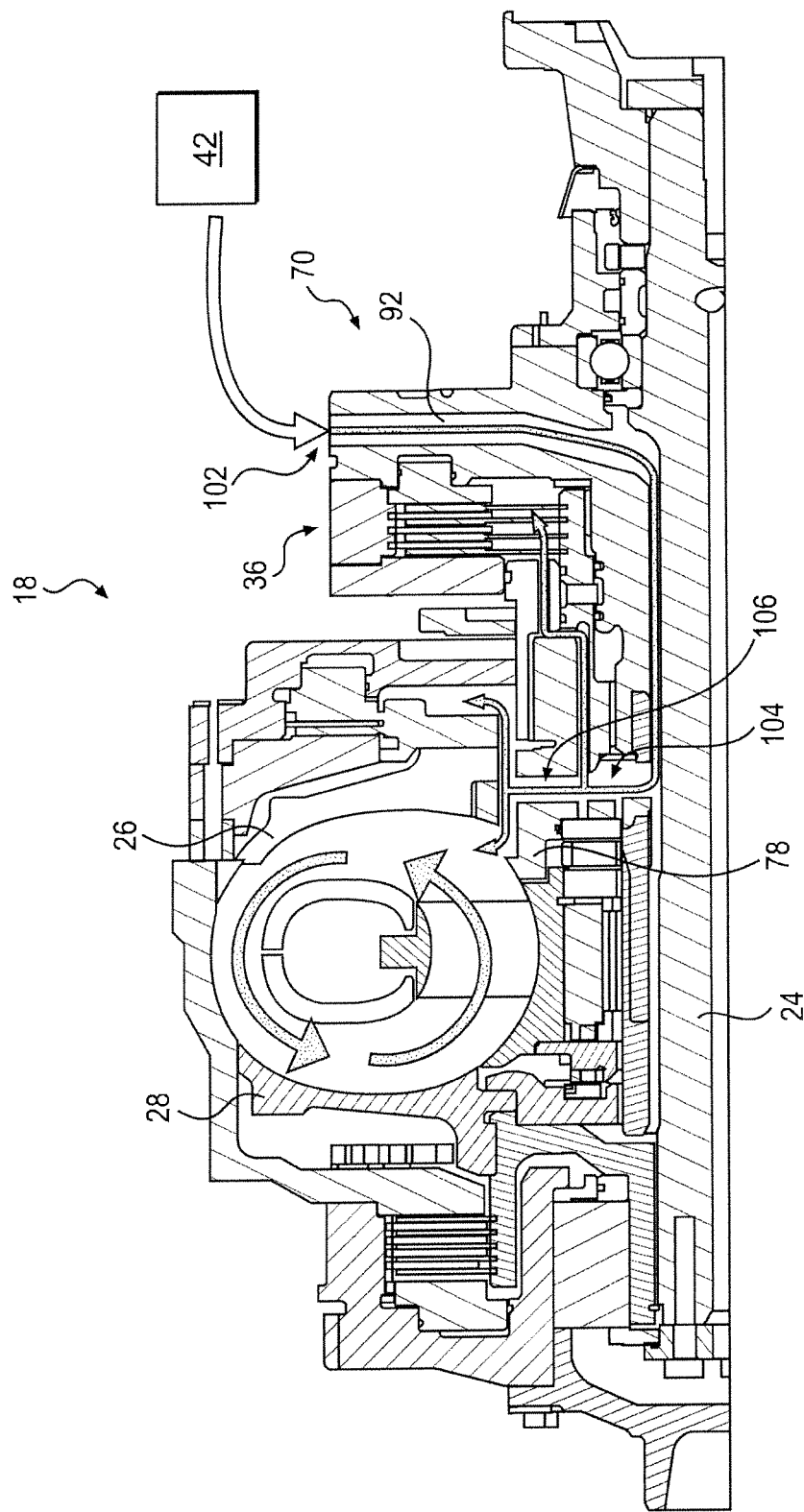
FIG. 9 is a cross-sectional view of the torque converter assembly of FIG. 2 showing flow to an impeller/turbine.

FIGS. 9-13 show fluid flows through torque converter assembly 18. FIG. 9 shows fluid flow through torque converter inlet passageway 92. Specifically, hydraulic fluid flows radially into inlet 102, through torque converter inlet passageway 92, and radially out outlet 104 into a first passageway 106 located in impeller hub 78. The hydraulic fluid then flows to impeller 26 and turbine 28. The hydraulic fluid flows in a rotational manner between impeller 26 and turbine 28, thus transferring rotational energy between the two components.

Figure 10:
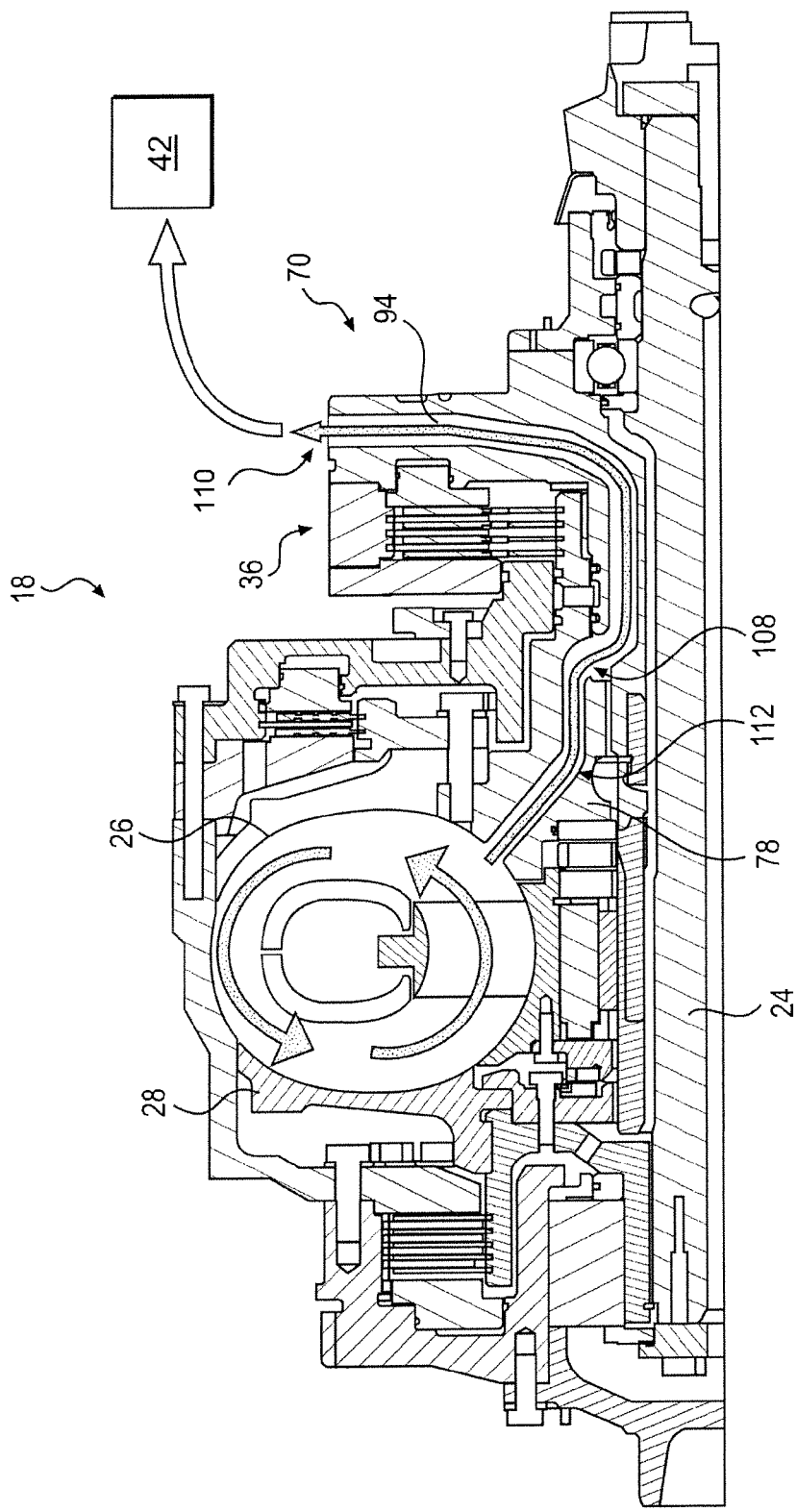
FIG. 10 is a cross-sectional view of the torque converter assembly of FIG. 2 showing flow out of the impeller/turbine.

FIG. 10 shows fluid flow through torque converter outlet passageway 94. Hydraulic fluid flows out of impeller 26 and turbine 28, through a second passageway 112 in impeller hub 78, and into inlet 108. The hydraulic fluid then flows through torque converter outlet passageway 94, and out outlet 110 back to hydraulic circuit 42.

Figure 11:
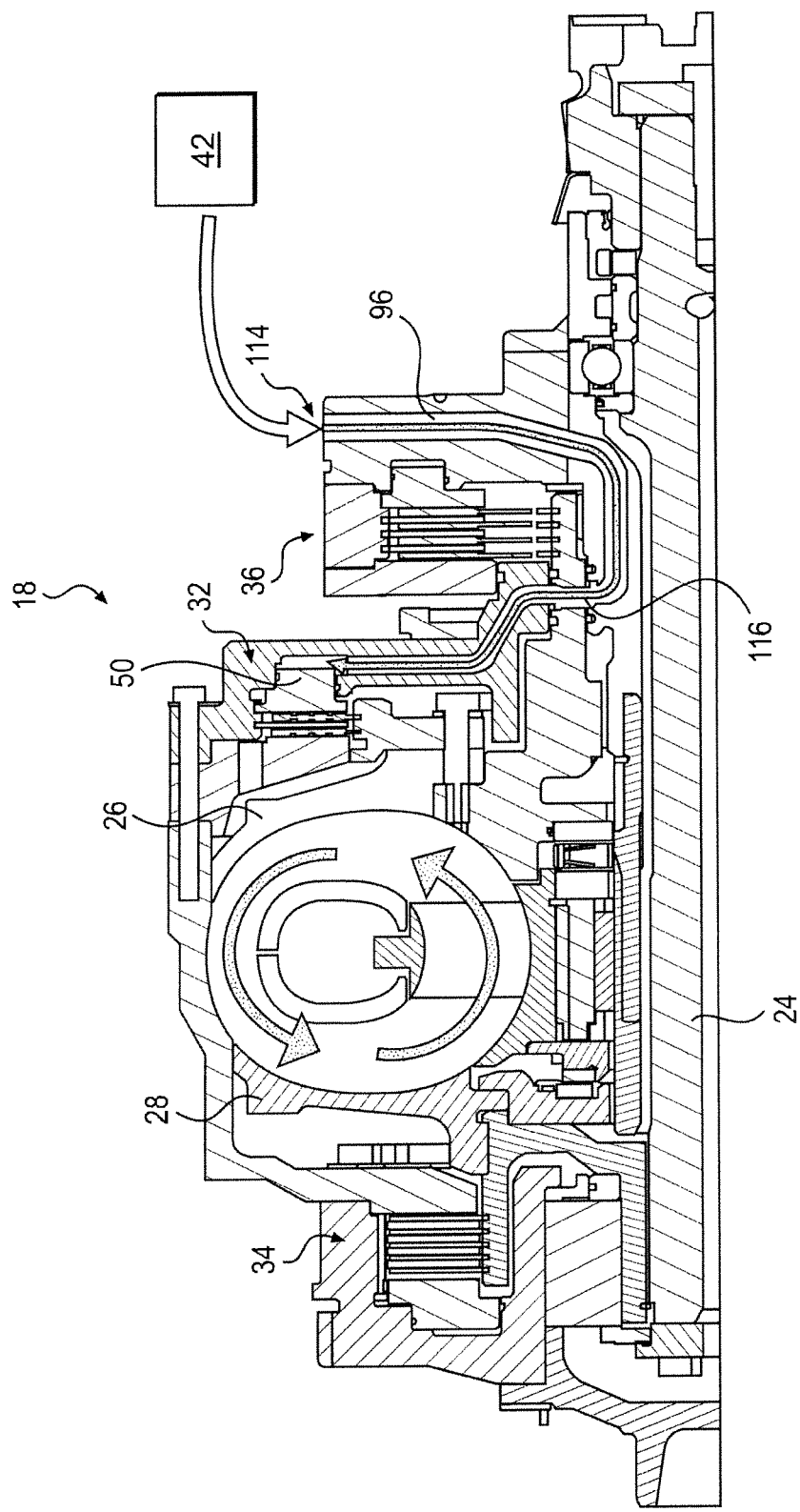
FIG. 11 is a cross-sectional view of the torque converter assembly of FIG. 2 showing flow to an impeller clutch.

FIG. 11 shows fluid flow through impeller clutch passageway 96. Hydraulic fluid flows from hydraulic circuit 42, through inlet 114 and into impeller clutch passageway 96. Fluid then flows out outlet 116 and to impeller clutch 32 to actuate piston 50.

Figure 12:
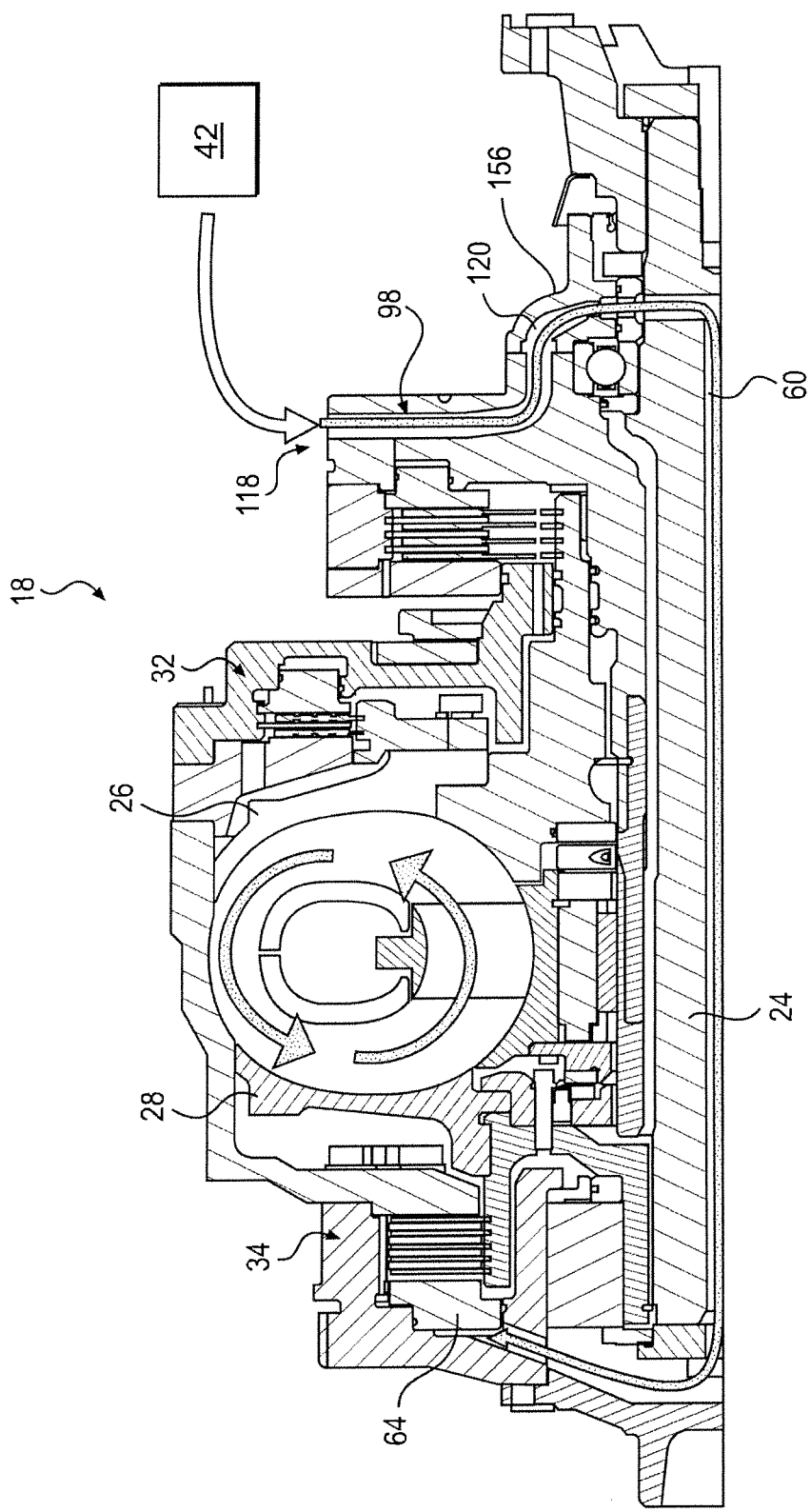
FIG. 12 is a cross-sectional view of the torque converter assembly of FIG. 2 showing flow to a lockup clutch.

FIG. 12 shows fluid flow through lockup clutch passageway 98. Hydraulic fluid flows from hydraulic circuit 42, through inlet 118 and into lockup clutch passageway 98.

Fluid then flows out outlet 120, through passageway 60 in shaft 24, and to lockup clutch 34 to actuate piston 64.

Figure 13:
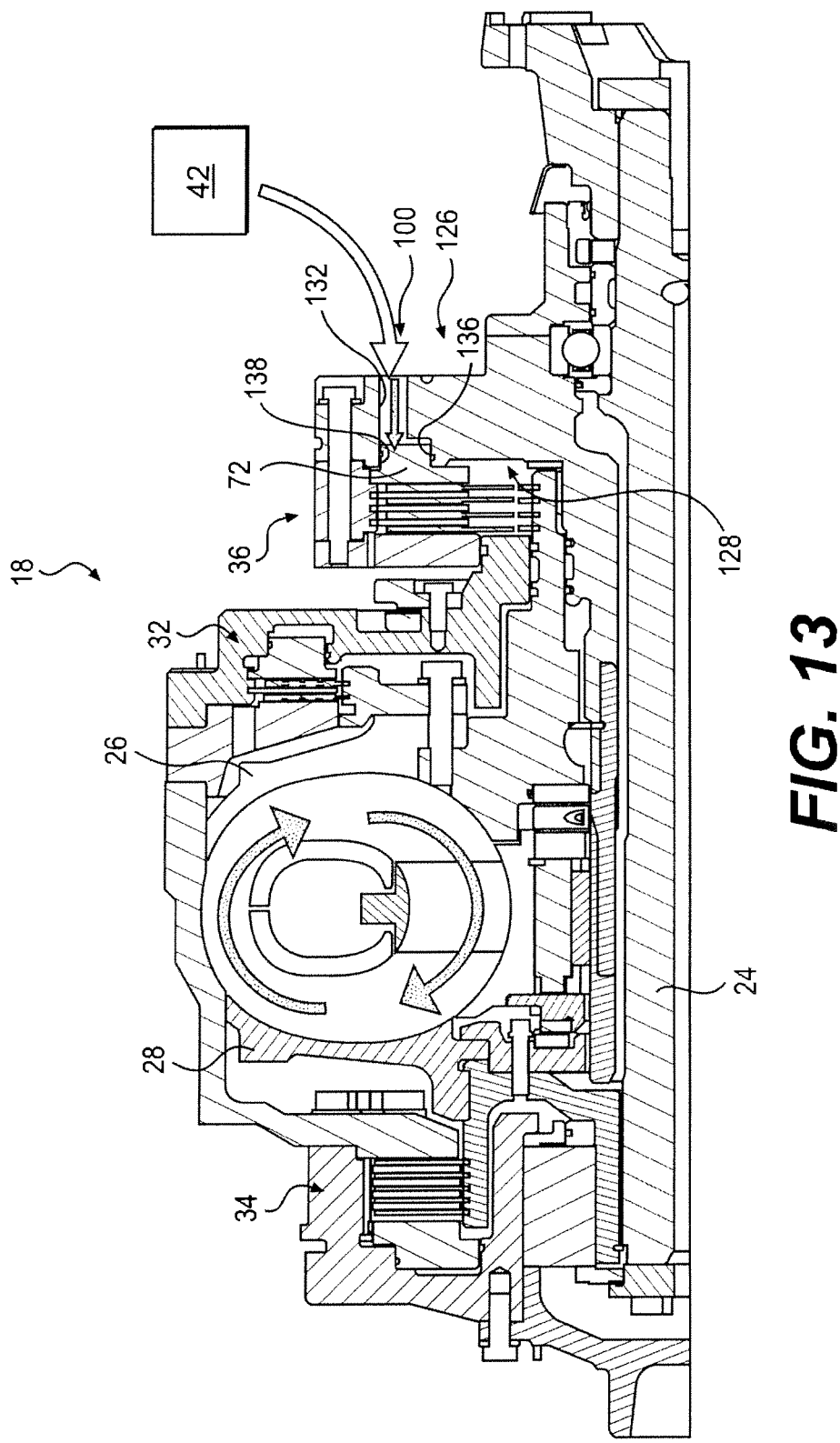
FIG. 13 is a cross-sectional view of the torque converter assembly of FIG. 2 showing flow to a retarder clutch.

FIG. 13 shows fluid flow through retarder clutch passageway 100. Hydraulic fluid flows from hydraulic circuit 42, through inlet 122 (not shown in FIG. 13) of retarder clutch passageway 100 and bifurcates into semi-circular passageway 130 (also not shown in FIG. 13). The bifrucated flow may pass around semi-circular passageway 130 and into first axial passageway 132 and second axial passageway 134 (only first axial passageway 132 is shown). Fluid then flows to outlet 124 where the bifrucated flow is rejoined as it passes circumferentially around outlet 124 to actuate piston 72.

INDUSTRIAL APPLICABILITY

The disclosed manifold and torque converter assembly may be applicable to any mobile machine. The disclosed manifold may provide a single component through which all hydraulic fluid for the torque converter may be routed. Using the disclosed manifold for routing all hydraulic fluid may facilitate maintenance and access to the fluid system. For example, all hydraulic lines may be piped to a single component in the torque converter assembly rather than multiple spaced-apart components.

The disclosed manifold may also improve heat transfer characteristics of the torque converter assembly. Fluid recirculation in the disclosed manifold to cool the impeller/turbine may transfer energy, with the passageways carrying fluid to the lockup clutch, impeller clutch, and the retarder clutch. Therefore, the disclosed manifold would minimize the need for additional components and piping for cooling the clutches, such as the retarder clutch. This results in fewer parts to maintain and replace and improves compactness of the torque converter assembly (reduces the overall envelope of space required for the torque converter assembly in the mobile machine).

The disclosed manifold may also provide a mechanical ground for the retarder clutch. Since the manifold provides both a ground, as well as a source of hydraulic fluid for the retarder clutch, components of the retarder clutch may be compactly fastened to the manifold, further improving the compactness of the torque converter assembly.

It will be apparent to those skilled in the art that various modifications and variations can be made to the disclosed manifold and torque converter assembly. Other embodiments will be apparent to those skilled in the art from consideration of the specification and practice of the disclosed manifold and torque converter assembly. It is intended that the specification and examples be considered as exemplary only, with a true scope being indicated by the following claims.

What is claimed is:

1. A manifold for a torque converter assembly, comprising:
a base portion configured to be fixedly connected to a frame of a mobile machine, the base portion having a first face, a second face, and an outer radial surface located between the first face and the second face;
a sleeve portion extending axially away from the second face of the base portion, the sleeve portion having an outer radial surface;
a first passageway configured to receive hydraulic fluid, the first passageway having an inlet in the outer radial surface of the base portion and an outlet in the outer radial surface of the sleeve portion, the outlet of the first passageway being in fluid communication with an impeller clutch; and
a second passageway configured to receive hydraulic fluid, the second passageway having an inlet in the first face and an outlet in the second face, the outlet of the second passageway being in fluid communication with a retarder clutch.

2. The manifold of claim 1, wherein the sleeve portion and the base portion define a longitudinal space configured to receive a rotatable shaft.

3. The manifold of claim 1, wherein the outlet of the first passageway fluidly communicates with an impeller and turbine.

4. The manifold of claim 1, further including a third passageway configured to receive hydraulic fluid, wherein the third passageway has an inlet in the outer radial surface of the base portion and an outlet in the first face.

5. The manifold of claim 4, wherein the outlet of the third passageway fluidly communicates with a lockup clutch.

6. The manifold of claim 1, wherein the second passageway includes:
a semi-circular passageway;
a first axial passageway and a second axial passageway both fluidly connected to the semi-circular passageway; and
an annular outlet fluidly connected to the first axial passageway and the second axial passageway.

7. The manifold of claim 6, wherein the annular outlet is configured to receive a portion of a hydraulic piston.

8. The manifold of claim 6, wherein the first axial passageway and the second axial passageway are located approximately 180 degrees apart.

9. The manifold of claim 7, wherein the first passageway is substantially J-shaped.

10. A torque converter assembly for a machine, comprising:
an output shaft defining a central axis, the output shaft having a first end and a second end;
an impeller disposed about the output shaft;
a turbine disposed about the output shaft, the turbine being configured to rotate in response to rotation of the impeller;
a hydraulic impeller clutch configured to couple the impeller to a rotational input to cause the impeller to rotate;
a manifold configured to be connected to a frame of the machine such that the manifold does not rotate with respect to the frame; and
a hydraulic retarder clutch connected to the manifold, wherein the hydraulic retarder clutch is configured to couple the impeller to the manifold to reduce rotation of the impeller;
wherein the manifold includes:
a first fluid passageway configured to supply hydraulic fluid to the impeller clutch; and
a second fluid passageway configured to supply hydraulic fluid to the hydraulic retarder clutch, the second passageway including an annular outlet that is configured to receive a piston of the hydraulic retarder clutch.

11. The assembly of claim 10, further comprising:
a lockup clutch;
a third fluid passageway in the manifold configured to supply fluid to the lockup clutch; and
a fourth fluid passageway in the manifold configured to supply fluid to the impeller and the turbine.

12. The assembly of claim 11, wherein the second passageway further includes:
a semi-circular passageway;
a first axial passageway and a second axial passageway both fluidly connected to the semi-circular passageway and the annular outlet.

13. The assembly of claim 10, wherein the manifold includes:
- a base portion having a first face, a second face, and an outer radial surface located between the first face and the second face; and
- a sleeve portion extending axially away from the second face of the base portion, the sleeve portion having an outer radial surface.

14. The assembly of claim 13, wherein the first passageway has an inlet in the outer radial surface of the base portion and an outlet in the outer radial surface of the sleeve portion, and the second passageway has an inlet in the first face and an outlet in the second face.

15. The assembly of claim 12, wherein the first and second axial passageways are located approximately 180 degrees apart.

16. A method of supplying fluid to a torque converter of a mobile machine with a manifold, the method comprising:
- flowing a first fluid through a first passageway of the manifold, the first passageway having an inlet in an outer radial surface of a base portion of the manifold and an outlet in an outer radial surface of a sleeve portion of the manifold, the outlet of the first passageway being in fluid communication with an impeller clutch;
- flowing the first fluid out of the first passageway and into the impeller clutch to actuate the impeller clutch;
- flowing a second fluid through a second passageway of the manifold, the second passageway having an inlet in a first face of the base portion and an outlet in a second face of the base portion, the outlet of the second passageway being in fluid communication with a retarder clutch;
- flowing the second fluid out of the second passageway and into the retarder clutch to actuate the retarder clutch;
- flowing a third fluid through a third passageway of the manifold; and
- flowing the third fluid out of the third passageway and into fluid contact with an impeller and a turbine of the torque converter,
- wherein the manifold is fixedly connected to a frame of the mobile machine.

17. The method of claim 16, wherein flowing the second fluid includes flowing the second fluid through a semi-circular passageway.

18. The method of claim 17, wherein flowing the second fluid further includes flowing the second fluid through a first axial passageway and a second axial passageway to an annular outlet.

* * * * *